US010890303B2

(12) United States Patent
Goldmeier (10) Patent No.: US 10,890,303 B2
(45) Date of Patent: Jan. 12, 2021

(54) LAMP SHADE WITH ORNAMENTATION UTILIZING LIGHT PIPES

(71) Applicant: Steven Goldmeier, Plainview, NY (US)

(72) Inventor: Steven Goldmeier, Plainview, NY (US)

( * ) Notice: Subject to any disclaimer, the term of this patent is extended or adjusted under 35 U.S.C. 154(b) by 0 days.

(21) Appl. No.: 16/688,537

(22) Filed: Nov. 19, 2019

(65) Prior Publication Data

US 2020/0158303 A1    May 21, 2020

Related U.S. Application Data

(60) Provisional application No. 62/769,366, filed on Nov. 19, 2018.

(51) Int. Cl.
| *F21V 21/00* | (2006.01) |
| *F21S 10/00* | (2006.01) |
| *F21V 8/00* | (2006.01) |
| *F21V 1/12* | (2006.01) |
| *F21Y 115/10* | (2016.01) |
| *F21W 121/00* | (2006.01) |

(52) U.S. Cl.
CPC .............. *F21S 10/005* (2013.01); *F21V 1/12* (2013.01); *G02B 6/0005* (2013.01); *F21W 2121/00* (2013.01); *F21Y 2115/10* (2016.08)

(58) Field of Classification Search
CPC .. F21S 10/005; F21V 1/12; F21V 1/02; F21V 1/00; G02B 6/005; F21Y 2115/10; F21W 2121/00

USPC .... 362/355, 356, 357, 365, 351, 216, 249.1, 362/249.2, 249.14, 249.16, 352
See application file for complete search history.

(56) References Cited

U.S. PATENT DOCUMENTS

| 4,344,115 A * | 8/1982 | Pickens ..................... F21V 1/00 |
| | | 362/216 |
| 5,408,396 A * | 4/1995 | Stanley ..................... A47G 1/12 |
| | | 362/104 |
| 2013/0201717 A1* | 8/2013 | Holman ..................... F21V 1/22 |
| | | 362/602 |
| 2018/0077767 A1* | 3/2018 | Soler ..................... A61M 21/02 |

* cited by examiner

*Primary Examiner* — Laura K Tso
(74) *Attorney, Agent, or Firm* — Alfred M. Walker

(57) ABSTRACT

Lamp shades are provided with ornamentation utilizing light pipes and fiber optics, using light pipe technology to provide an ornamented shade. For lampshades of the truncated conical shape type, this light pipe ornamentation includes light emitting top and/or bottom circular rims, as well as an optional light emitting central thematic character/logo figure in 3D relief. Light is transmitted from the interior of the shade to illuminate the light pipe features, or from fiber optic electrically conductive wires/cables, which may include circular light pipes attached as integrally formed top and bottom rims of the lamp shade. Alternatively, the circular decorative light pipes may be formed by a plurality of arcuate segments, which, when joined together, form a circular rim, where light may be diffused and sent through the segments. The translucent light pipe elements may be injection molded of tinted light guide grade plastic resin.

23 Claims, 8 Drawing Sheets

LAMP SHADE WITH ORNAMENTATION UTILIZING LIGHT PIPES

RELATED APPLICATIONS

This application is based in part upon U.S. provisional patent application No. 62/769,366 filed Nov. 19, 2018. Applicant claims priority under 35 USC section 119 (e) and claims priority therefrom. The '366 application is incorporated by reference herein in its entirety.

FIELD OF THE INVENTION

The present invention relates to lamp shades with ornamentation utilizing light pipes and fiber optics.

BACKGROUND OF THE INVENTION

Lamp shades have a practical purpose besides their ornamental use. Many methods of lamp shade ornamentation have been used over the centuries. This invention shows one method of using light pipe technology to provide an ornamented shade that is easy to manufacture and uses low cost components and fabrication techniques.

The prior art has used light pipes for a wide variety of uses. U.S. Pat. No. 9,933,555 of Henry et al. shows the use of flexible bent light pipes in a receptacle assembly. U.S. Pat. No. 7,178,941 of Roberge et al. shows a wide variety of types and uses of fiber optics and light pipes. U.S. Pat. No. 5,558,421 of Guastella describes a decorative fiber optic lamp, where a radial sunburst pattern of electrically conductive fiber optic fiber strands 46 illuminate a globe 84. U.S. Pat. No. 6,546,174B2 of Clarkin discloses long length, lateral side emitting fiber optic cables.

OBJECTS OF THE INVENTION

It is an object of the present invention to provide decorative rims and surface images to lamp shades, using light pipes and fiber optics.

Other objects which become apparent from the following description of the present invention.

SUMMARY OF THE INVENTION

This invention relates to ornamentation of a lampshade of the truncated conical shape type. The light pipe ornamentation includes light emitting top and bottom circular rims as well as one or more light emitting central thematic character/logo ornaments, preferably in 3D relief. Optionally, the light emitting ornament may be a logo of a sports team or theatrical presentation, or other abstract designed ornament. In this invention, light is transmitted from the interior of the lamp shade to illuminate the light pipe features of the circular rims, which may include one or more circular light pipes attached as integrally formed top and bottom rims of the lamp shade. Alternatively, the circular decorative light pipes may be formed by a plurality of arcuate light pipe tile segments, which, when joined together, form a circular rim. In such an embodiment, light may be diffused and sent through the light pipe tile segments, which are attached by adhesive, and/or by inner side protrusions extending through holes punched in the main light diffusing sheet or fabric of the shade.

The translucent light pipe elements are preferably injection molded of tinted light guide grade plastic resin such as, for example, acrylic. This is a very low-cost method of manufacture. They are then adhesively bonded, or otherwise attached, to the outer surface of the shade diffuser.

In an alternate embodiment, the light pipe ornamentation includes electrically illuminated circular rims as well as one or more light emitting central thematic character/logo ornaments, preferably in 3D relief. The electrically illuminated features are connected to a power source, preferably to a low voltage DC power source such as a battery. The thematic central feature is illuminated via one or more small LED's being positioned inside one or more blind holes drilled partway through the feature and then powered. The illuminated circular rims may be an array of narrow tiles each with one or more LED positioned in blind holes on the back side of each tile. In a further alternate embodiment, the illuminated circular rims may be formed of side emitting plastic optical fibers illuminated by one or more LED's located in the base of the lamp.

BRIEF DESCRIPTION OF THE DRAWINGS

The present invention can best be understood in connection with the accompanying drawings. It is noted that the invention is not limited to the precise embodiments shown in the following drawings, in which.

DETAILED DESCRIPTION OF THE INVENTION

For illustrative purposes only, preferred modes for carrying out the invention is described herein.

Figure 1:
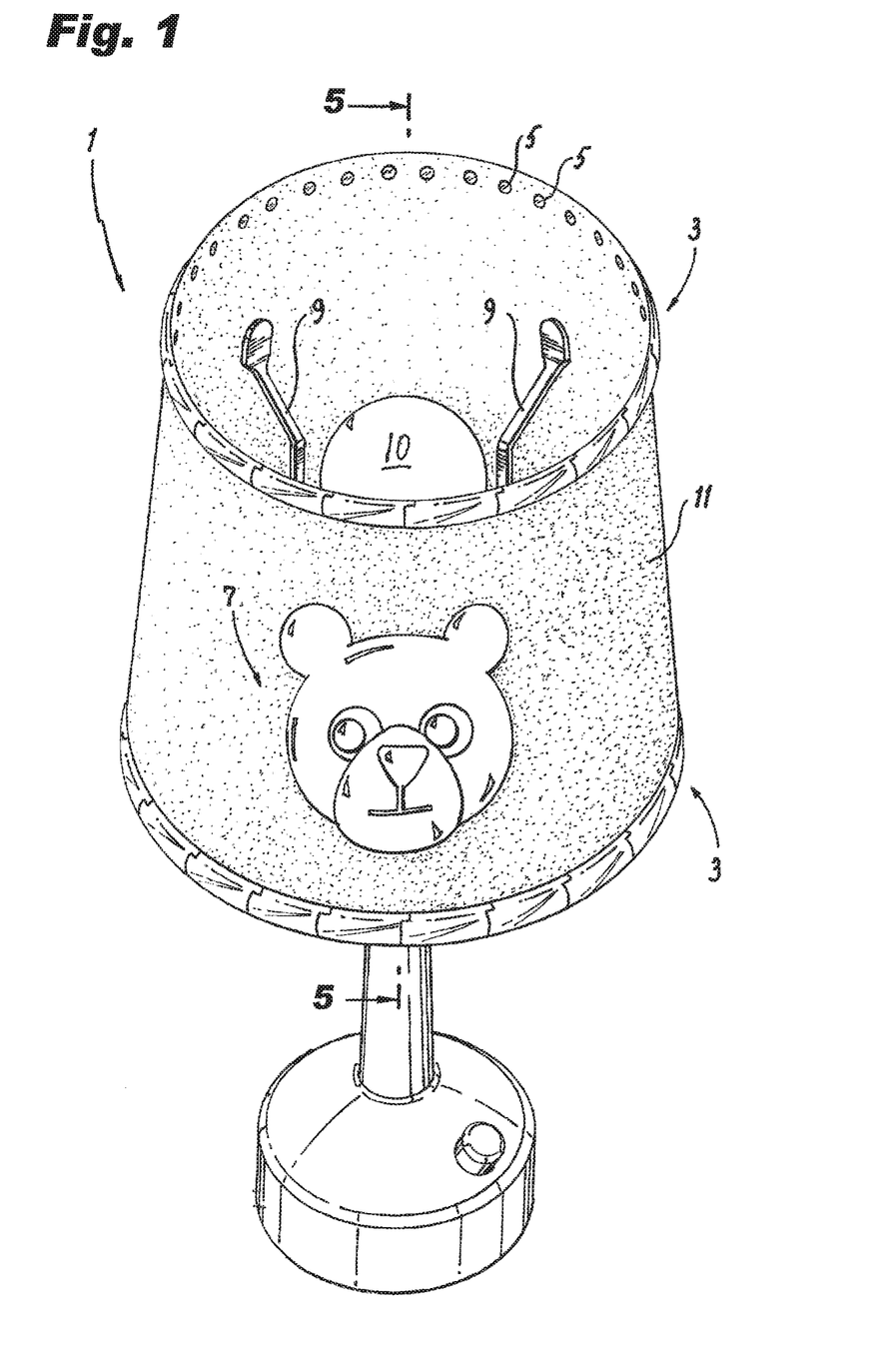
FIG. 1 is a perspective view of a completed lamp shade, shown installed on a lamp where the lampshade includes top and bottom light pipe rims which are illuminated by the light from a central light bulb.

In the first embodiment, the glowing circular rims 3 are made of a light transmitting material and tinted with the desired color. FIG. 1 shows a completed ornamented lamp shade 1, mounted on a lamp having a base, a light source 10, such as, for example, an incandescent or LED lightbulb, a fluorescent lightbulb or array of LED lights, or other light source known to those skilled in the art of light technology. Although integral one-piece circular rims 3 may be used, for ease of molding and assembly, in a preferred embodiment, these circular rims 3 are shown composed of a number of elongated arcuate segment light pipe tiles 15, which when joined, may form a full circular rim 3 as well. These arcuate light pipe tile segments 15 are described in FIGS. 2-4. It is also noted that the circular rims can have any geometric shape, such as square, rectangular, ovoid or other geometric shape forming a hollow vessel lampshade opened at both ends, formed between top and bottom rims supporting light diffuser/fabric material therebetween, at upper and lower edge regions thereof.

Lamp shade 1 has structural frame members 9, to attach lamp shade 1 to a lamp, as well as diffuser sheet and/or fabric 11, with optional central ornament 7 of a thematic character/logo, and holes 5 to permit light from light source 10, such as an incandescent or LED lightbulb, to enter the light pipe tiles 15, that collectively make up rims 3. Behind ornament 7 is optionally provided an array of holes (not shown) in diffuser sheet/fabric 11, as needed to illuminate the 3D relief figure ornament 7. Light pipe tiles 15 accept light from one or more inputs and scatter it with reflection internally, as shown in the dashed radially extending lines emanating from light source 10 of FIG. 5. They exit light at a polished window, or they diffuse the light through the body of the structure or through a surface that is matted for this purpose. Fillers in the plastic of light pipe tiles 15 also can control the diffusion of light as desired. It is noted that the edge light pipe tiles 15 and the ornament 7 can have different colored tints. To prevent wash out of the light emitting ornamental features, a less transmissive diffusing surface 11 can be used.

Figures 2, 3, 4:
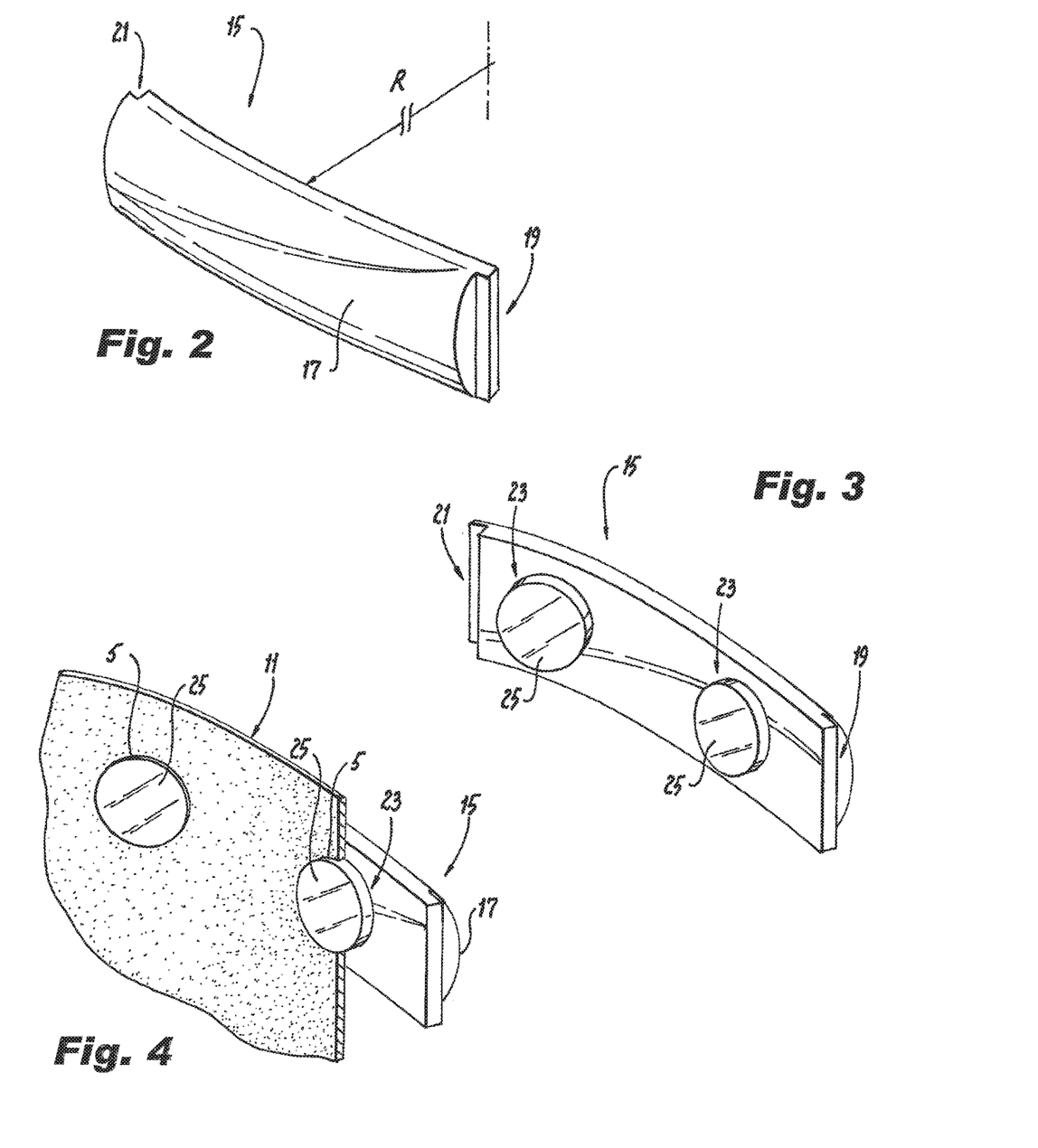
FIG. 2 is a perspective view of the exterior of one edge light pipe tile.
FIG. 3 is a perspective view of the interior surface of an edge light pipe tile.
FIG. 4 is a close-up detail perspective edge view showing an edge light pipe tile, as mounted by protrusions extending through a hole in the light diffuser/fabric (which is shown in partial cross section)

FIG. 2 shows an outer view of an edge light pipe tile 15. It is noted that one end 19 of the edge light pipe tile 15 has a step extension 19 while the opposite end has a notch 21. The notch 21 accepts the extension 19 of the following adjacent edge light pipe tile 15, to complete the circle of circular rim 3, while hiding any unsightly gaps. The outer visible surface 17 of edge light pipe tile 15 is preferably convex. It is also noted that the edge light pipe tiles 15 for the top circular ring 3 are not identical to the bottom ring edge light pipe tiles 15. That is because the principal radius "R", shown in FIG. 2, is different in the circular rim 3 formed by the top light pipe tiles 15 and in the circular rim 3 formed by the bottom light pipe tiles 15, since the ring diameters "R" are different for each circular ring 3. The light pipe tiles would not lie flush to the surface of light diffuser/fabric 11 unless molded to fit at the top circular rim 3 or the bottom circular rim 3.

FIG. 3 shows the back side of a light pipe tile 15. While one or more protrusions 25 may extend from the rear side of light pipe tiles 3, it is noted that the two protrusions 23 shown in FIG. 3, each with polished ends 25, are preferably provided for gathering light through holes 5 in diffuser sheet/fabric 11.

The required fit of protrusions 23 through holes 5 in light diffuser/fabric 11 is shown in FIG. 4. Ornament 7 shown in FIGS. 1 and 5 must also fit the arcuate surface of the surface of light diffuser/fabric 11 in a conformal manner. Inner surface 27 of edge light pipe tiles 15 can be optionally used for adhesive bonding.

Figure 5:
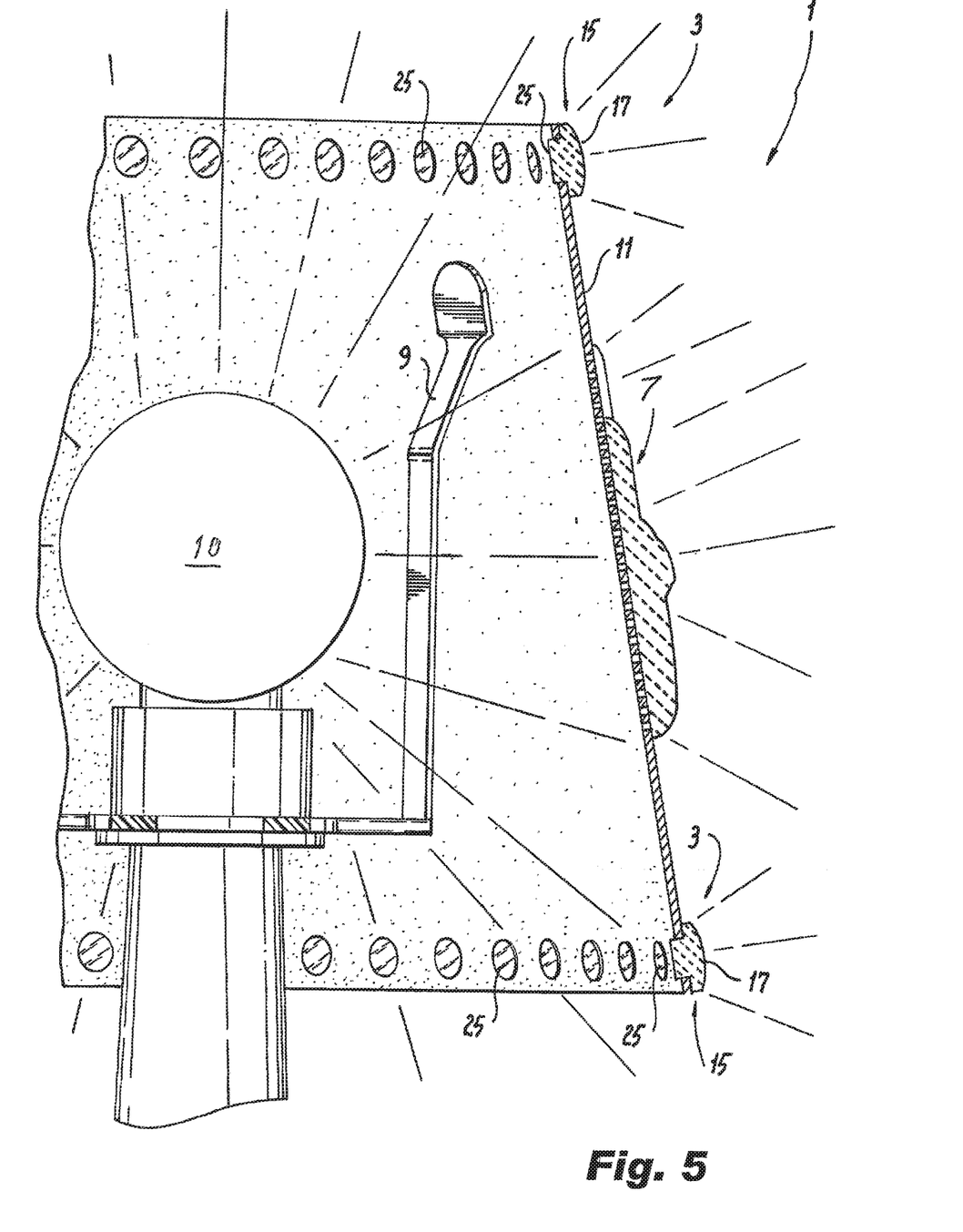
FIG. 5 is a sectional elevation taken at cut line 5-5 of FIG. 1, showing the reception and diffusion of light by the upper and lower circular rims and with the central character/logo; when the light source is enabled.
Figure 6:
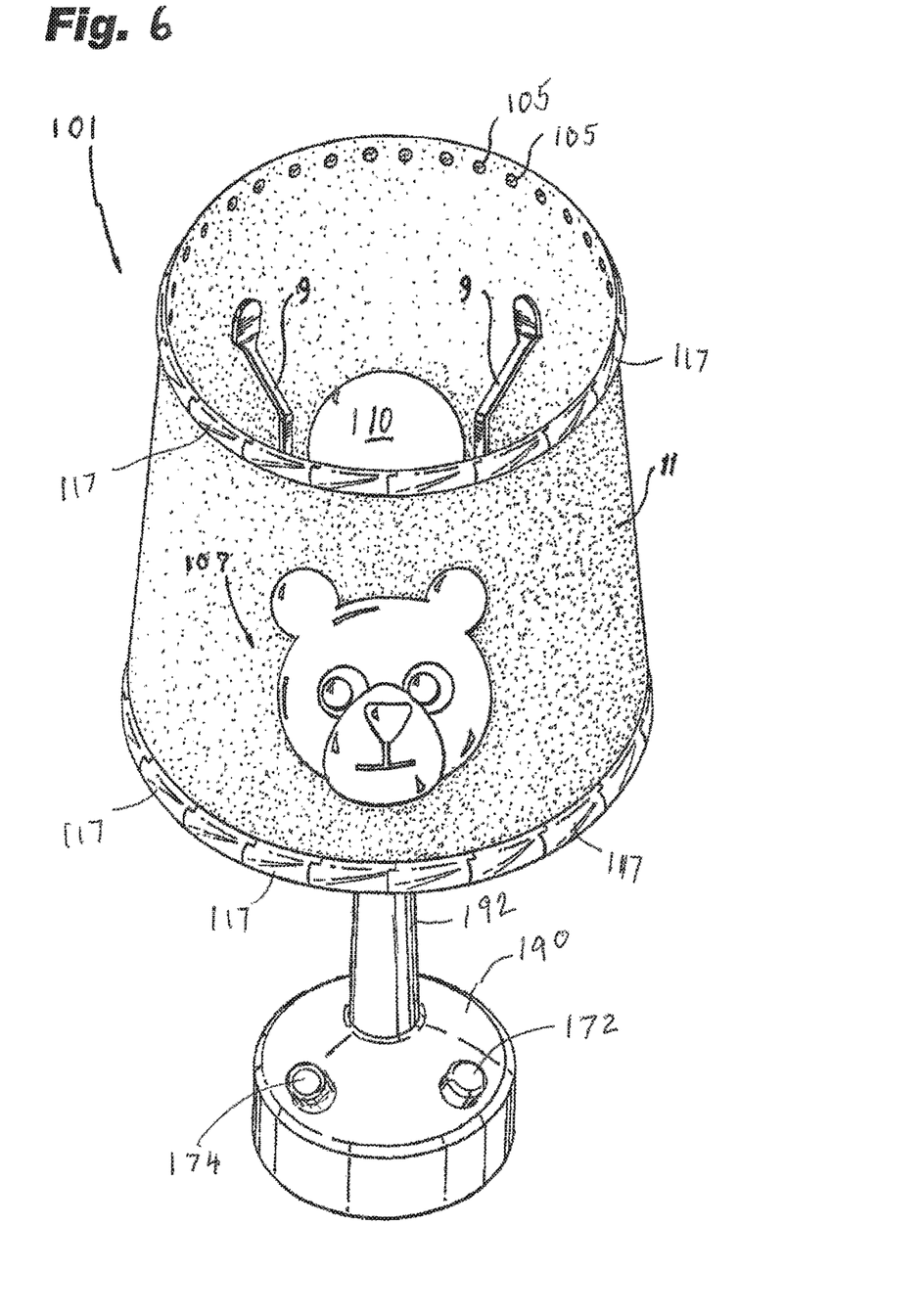
FIG. 6 is a perspective view of the decorative lamp of this invention using direct electrical illumination of rim and logo features by virtue of LED's on the back side in an alternate embodiment.

FIG. 5 shows lampshade 1, supported by frame members 9 to a lamp having light source 10, and extending between circular rings 3, formed from light pipe tile segments 15, with convex outer surfaces 17, including the reception and diffusion of light from the light source 10, by the upper and lower circular rims 3, and with the central character/logo ornament 7 attached to light diffuser/fabric 11 of lampshade 1, when the light source 10 is enabled.

The glowing circular rims 3 are made of a light transmitting material and tinted with the desired color. FIG. 1 shows a completed ornamented lamp shade 1, mounted on a lamp having a light source 10, such as, for example, an incandescent or LED lightbulb, a fluorescent lightbulb or array of LED lights, or other light source known to those skilled in the art of light technology. Although integral one-piece circular rims 3 may be used, for ease of molding and assembly, in a preferred embodiment, these circular rims 3 are shown composed of a number of elongated arcuate light pipe tile segments 15, which when joined, may form a full circular rim 3 as well. These arcuate light pipe tile segments 15 are described in FIGS. 2-4. It is also noted that the circular rims can have any geometric shape, such as square, rectangular, ovoid or other geometric shape forming a hollow vessel lampshade opened at both ends, formed between top and bottom rims supporting light diffuser/fabric material therebetween, at upper and lower edge regions thereof.

Figure 7:
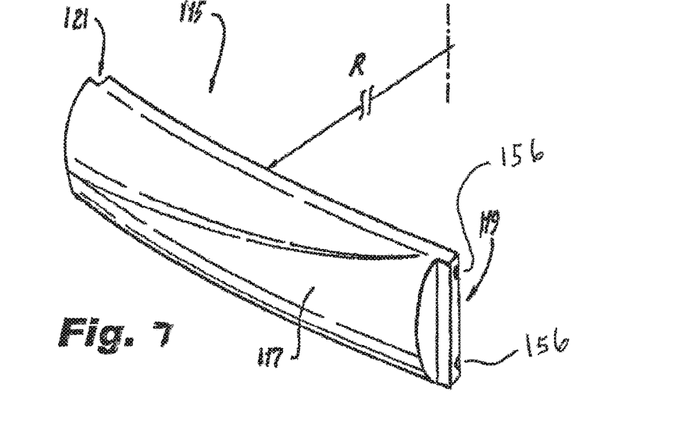
FIG. 7 is a perspective front close-up of a rim tile.
Figures 8, 9:
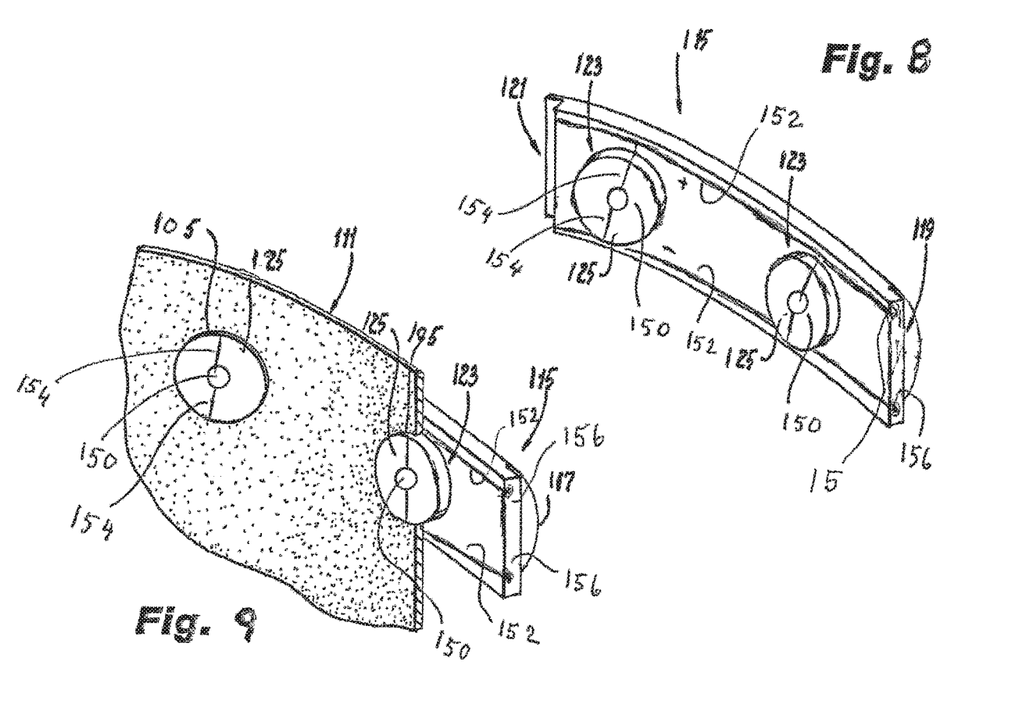
FIG. 8 is a perspective back close-up view of a rim tile showing illuminating LED's and wiring details.
FIG. 9 is a rear perspective detail showing the fit between the rim tile and the shade diffuser.

FIGS. 6, 7, 8 and 9 show perspective views of a second embodiment 101 which uses directly illuminated tiles 115 for the rims and a self-illuminated logo 107 for lamp shade 11. Diffuser sheet or fabric 111 and holes 105 through it, to accept tiles 115, at top and bottom rims are also shown. Two switches are used 174 for the logo and rims and 172 for the main source of illumination 110. Light source 110 may be a 110-volt AC source such as a compact fluorescent, LED, or incandescent lamp. It may be a lower illumination LED that could be powered by a battery housed in base 190. With two switches, only the logo and rims can be on or only the main light can be on. Hollow column 192 supports the lamp shade 11 and provides a path for running power lines whether AC or low voltage DC. FIGS. 7, 8 and 9 show close-up details of the rim tiles 115. The tiles 115 are curved to fit the respective rim, top or bottom; they have a convex front 117. One end of each tile 115 has a step extension 119 while the opposite end has a notch so they can be assembled around the top and bottom rims of the lamp shade 11 formed of fabric 111. As shown in FIG. 8, the back side is flat from top to bottom but it has two protrusions 123 with polished ends 125. Electrical bus bars 152 are attached to the back and power LED's 150 through wires 154 being attached to the + and − bus bars 152. On the ends of each tile 115, are spring contacts 156 which electrically attach one tile bus bar to the adjacent one, thus the tiles 115 form a complete circle when they are all installed. FIG. 9 shows a detail of a tile 115 with protrusions through holes 105. The power cable from below is connected between a pair of adjacent tiles by terminating the cable in flat contacts.

Figure 10:
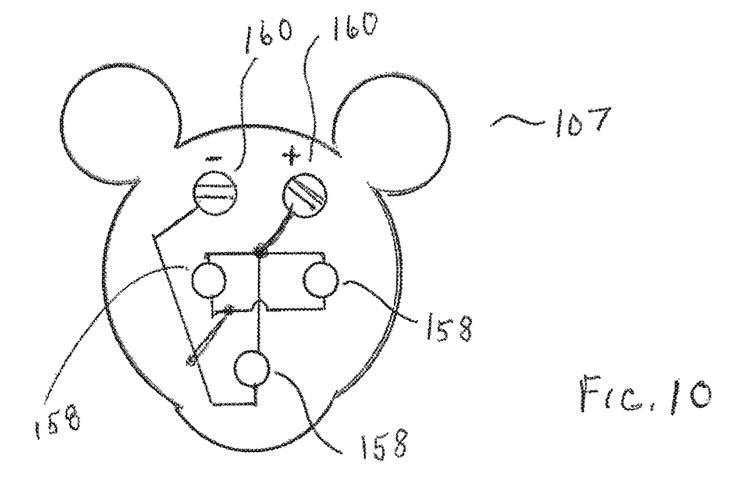
FIG. 10 is a plan view of the back side of a logo features using three LED's.
Figure 11:
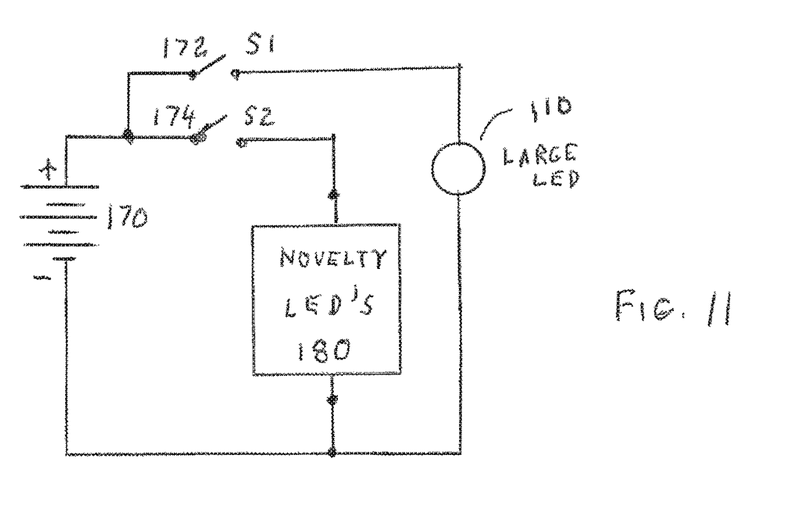
FIG. 11 is a schematic diagram of a totally battery-operated decorative lamp of this invention.
Figure 13:
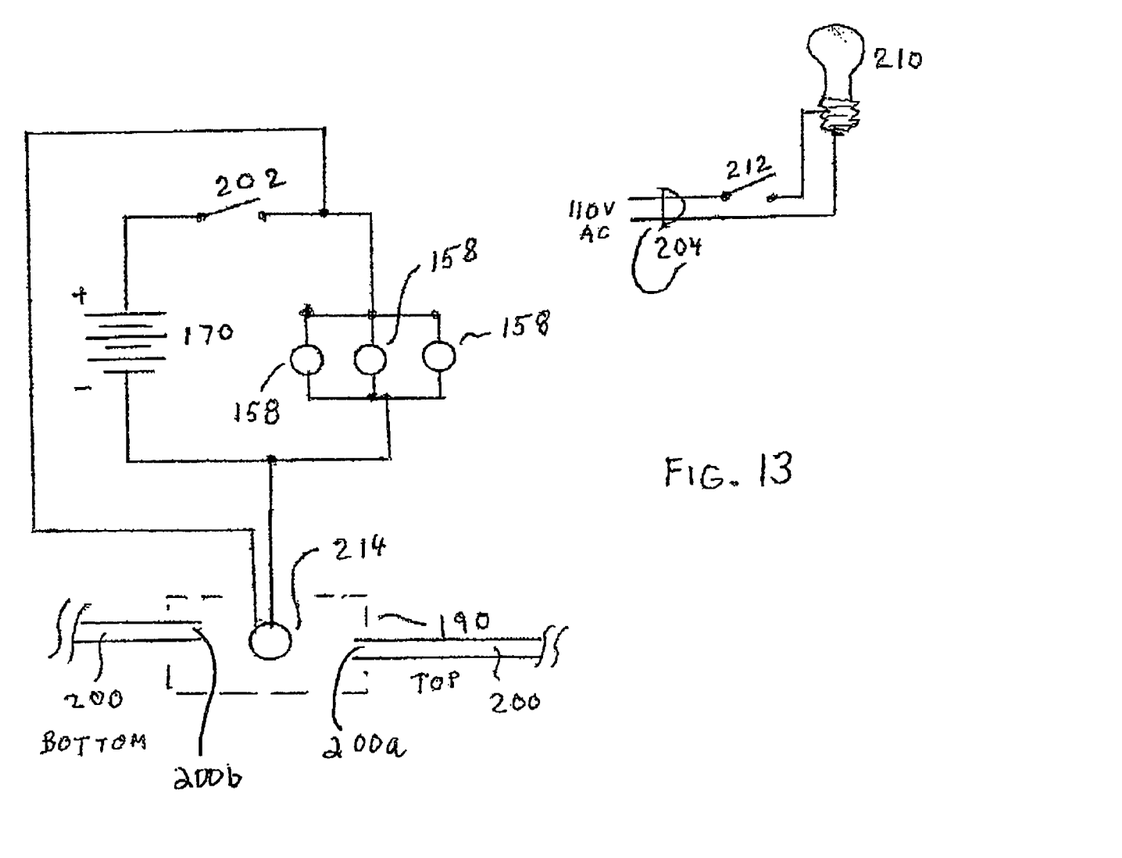

FIG. 10 shows the back of a logo element 107 having three small LED's 158 connected to power screws 160. The schematic for this embodiment as run completely by battery 170 is shown in FIG. 11. Novelty LED's 180 includes the three 158 LED's plus all of the small tile LED's 150 all connected in parallel. Large LED 110 is the main lamp light source. In a different configuration, an AC illuminator may be used and is handled separately (as shown in the schematic of FIG. 13 for the next embodiment).

Figure 12:
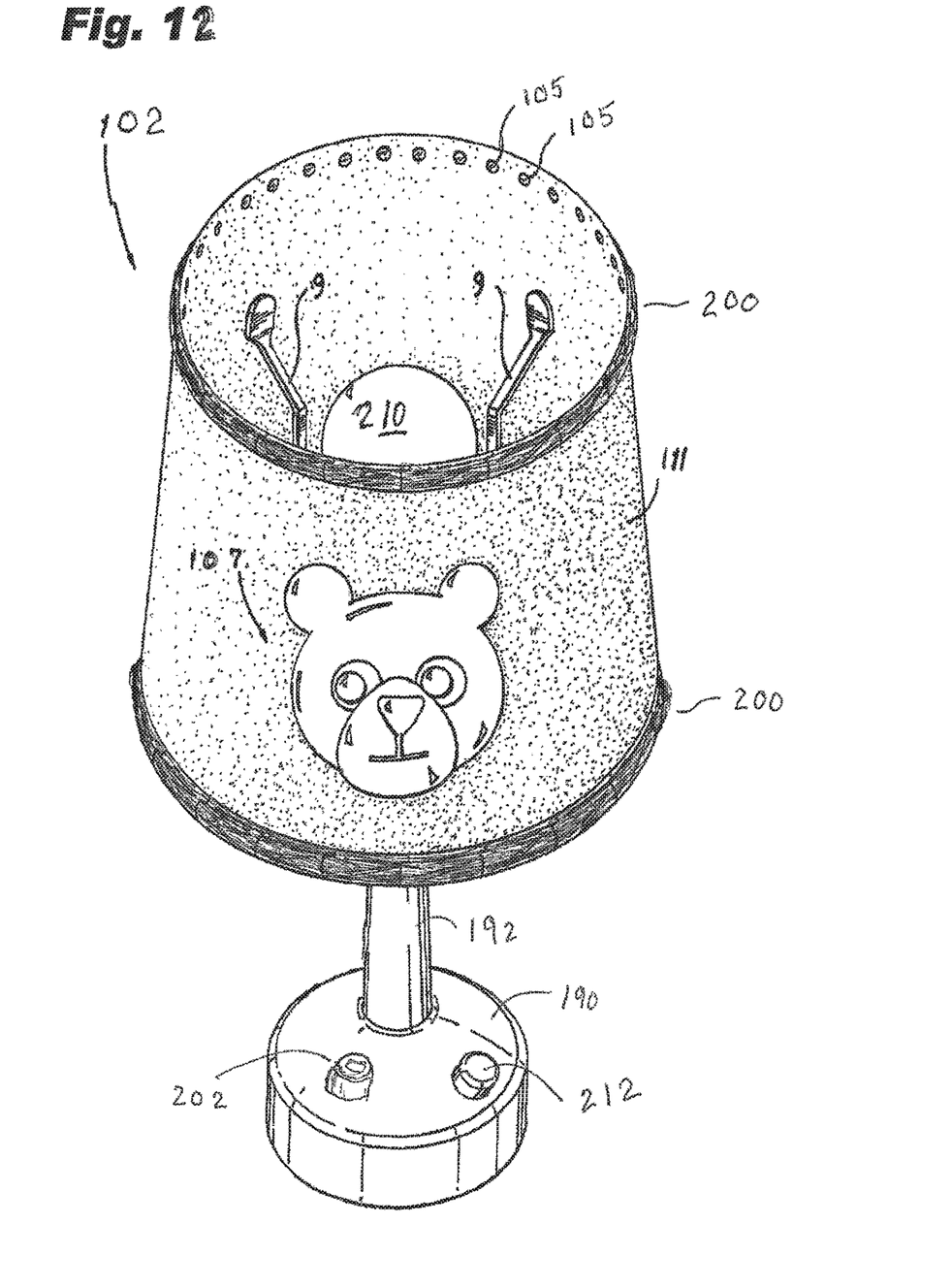
FIG. 12 is perspective view of another embodiment of this invention showing a lamp with light emitting rims using side emitting plastic optical fibers; and, FIG. 13 is a schematic diagram of an embodiment using rims using side emitting plastic optical fibers which are battery illuminated as are the logo feature LED's. The main lamp illumination is a 110-volt AC incandescent lamp.

Another embodiment uses plastic side emitting optical fibers which emit light along their entire length when illuminated from one end. This is a low diffuse light emission that may be sleep inductive to a child. FIG. 12 is a perspective view of such a lamp 102. As in the previous embodiment, two separate switches are used so that the logo and rims can be controlled separately from the main illuminator 210. In this embodiment an AC main light source is used. Rims 200 of FIG. 12, which are fiber optic bundles, are attached to the top and bottom shade edges of the shade with a straggling end 200a or 200b of the long length lateral side emitting optical fibers of rims 200, 200 being fed down central tube 192 and aimed at an LED 214 inside base 190. FIG. 13 is a schematic of this embodiment showing three LED's 158 from the logo as well as rim LED 214 deriving their power from a battery 170. Main lamp light source 210 is shown as a separately switched lamp plugged 204 into 110 VAC. Switch 202 controls the rim and logo illumination while switch 212 controls the illumination lamp.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing from the scope of the invention.

I claim:

1. A lamp shade having ornamentation utilizing light pipes and fiber optics using light pipe technology to provide an ornamented shade, comprising:
   a main illuminator light source within a hollow truncated geometric shaped vessel lampshade, said vessel lampshade opened at both ends, including a continuous shaped light diffuser surface, extending between light emitting top and/or bottom geometrically shaped rims;
   whereby light is transmitted from the interior of the lamp shade to illuminate said top and/or bottom geometrically shaped rims;
   said light emitting top and/or bottom continuous geometrically shaped rims are translucent, where light is diffused and sent therethrough;
   wherein said continuous geometrically shaped rims are formed by a plurality of arcuate light transmitting light pipe tile segments, which, when joined together, form said respective continuous geometrically shaped rims, where light is diffused and sent through said arcuate light pipe tile segments.

2. A lamp shade having ornamentation utilizing light pipes and fiber optics using light pipe technology to provide an ornamented shade, comprising:
   a main illuminator light source within a hollow truncated geometric shaped vessel lampshade, said vessel lampshade opened at both ends, including a continuous shaped light diffuser surface, extending between light emitting top and/or bottom geometrically shaped rims;
   whereby light is transmitted from the interior of the lamp shade to illuminate said top and/or bottom geometrically shaped rims;
   said light emitting top and/or bottom continuous geometrically shaped rims are translucent, where light is diffused and sent therethrough;
   at least one light emitting central thematic character/logo ornament mounted to said continuous shaped light diffuser surface of said hollow truncated geometric shaped vessel lampshade, said vessel lampshade opened at both ends, said ornament having an arcuate rear surface attached to an outer surface of said continuous shaped light diffuser surface of said hollow truncated geometrically shaped vessel lampshade, opened at both ends.

3. The lamp shade as in claim 2 wherein said at least one light emitting central thematic character/logo ornament is presented in 3D relief.

4. The lamp shade as in claim 2 wherein said at least one light emitting central thematic character/logo ornament at least one of a light emitting central thematic character/logo ornament.

5. The lampshade as in claim 1 wherein said light transmitting segments are molded of plastic resin material.

6. The lampshade as in claim 1 wherein said light pipe tile segments ae injection molded of tinted light guide grade plastic resin.

7. The lampshade as in claim 1 wherein said top and/or bottom geometrically shaped rims, are circular rims.

8. The lampshade as in claim 1 wherein said light transmitting light pipe tile segments are adhesively attached together.

9. The lampshade as in claim 6 wherein said light transmitting elements are attached to said lampshade by inner side protrusions extending through holes punched in said lampshade, at upper and lower edge regions thereof.

10. The lampshade as in claim 9 further comprising said light transmitting light pipe tile segments including an end having a protruding step extension and an opposite end having a notch, wherein said notch accepts said extension of an adjacent following adjacent edge light pipe tile segment, to complete the circle of said circular rim, while hiding any unsightly gaps.

11. The lampshade as in claim 1 wherein an outer visible surface of each said edge light pipe tile is convex.

12. The lampshade as in claim 1 wherein each said light pipe tile segment lies flush to a surface of said lampshade, by being molded to fit at the top and/or bottom light emitting continuous geometrically shaped rims.

13. The lampshade as in claim 6 wherein fillers are embedded in the plastic of said light pipe tile segments to control the diffusion of light therethrough.

14. The lampshade as in claim 13, wherein, to prevent wash out of light emitting through said light pipe tile segments, said lampshade contains low light transmissive diffusing surface.

15. The lampshade as in claim 1 wherein said main illuminator light source is selected from the group consisting of an incandescent lightbulb, an LED lightbulb, an array of LED lights, a fluorescent lightbulb, a fiber optic cable and an electrically conductive cable.

16. The lampshade as in claim 1 wherein said light emitting top and/or bottom geometrically shaped rims each have a light source selected from the group consisting of at least one fiber optic cable and an electrically conductive cable connected to an electrical power source.

17. The lampshade as in claim 2 wherein said light emitting control thematic character/logo ornament has a light source selected from the group consisting of at least one fiber optic cable and an electrically conductive cable connected to an electrical power source.

18. The lampshade as in claim 16 wherein said at least one fiber optic cable comprises a long length, lateral side emitting fiber optic cable bundle, wherein two separate switches ae used so that said ornament and said rims are controllable separately from said main illuminator light source, wherein each said upper and lower rim is attached to respective top and bottom shade edges of the shade with a respective straggling end of said long length, lateral side emitting fiber optic cable bundle is fed down a central tube of said lamp and aimed at an LED light source inside said base of said lamp.

19. The lampshade as in claim 17 wherein said at least one fiber optic cable comprises a plurality of fiber optic cables, wherein each comprise at least one long length, lateral side emitting fiber optic cable, wherein two separate switches are used so that said ornament and said rims are controllable separately from said main illuminator light source, wherein said ornament is attached to a surface of the shade with a straggling end of said long length, lateral side emitting fiber optic cable is fed down a central tube of said lamp and aimed at an LED light source inside said base of said lamp.

20. The lampshade as in claim 1 wherein said light emitting top and/or bottom geometrically shaped rims each have at least one LED light source connected to an electrical power source.

21. The lampshade as in claim 2 wherein said light emitting control thematic character/logo ornament has at least one LED light source connected to an electrical power source.

22. The lampshade as in claim 20 wherein electrical bus bars are attached to the back of each said light pipe tile segment and which power LED lights through wires attached to respective + and − bus bars, wherein further on respective ends of each light pipe tile segment, are provided respective spring contacts which electrically attach a respective light pipe tile segment bus bar to the adjacent light pipe tile segment bus bar, whereby said light pipe tile segments form a complete circle when installed together and wherein a power cable from below is connected between a pair of adjacent light pipe tile segments by terminating the cable in flat contacts.

23. The lampshade as in claim 21 wherein said thematic character/logo ornament includes a plurality of LED lights, wherein electrical bus bars are attached to the back of said thematic character/logo ornament and which power said LED lights through wires attached to respective + and − bus bars, and wherein a power cable from below is connected between respective pairs of adjacent LED lights.

* * * * *